March 11, 1941.　　J. W. LEIGHTON　　2,234,803
INDIVIDUAL SPRINGING CONNECTION
Filed Nov. 2, 1938　　3 Sheets-Sheet 3
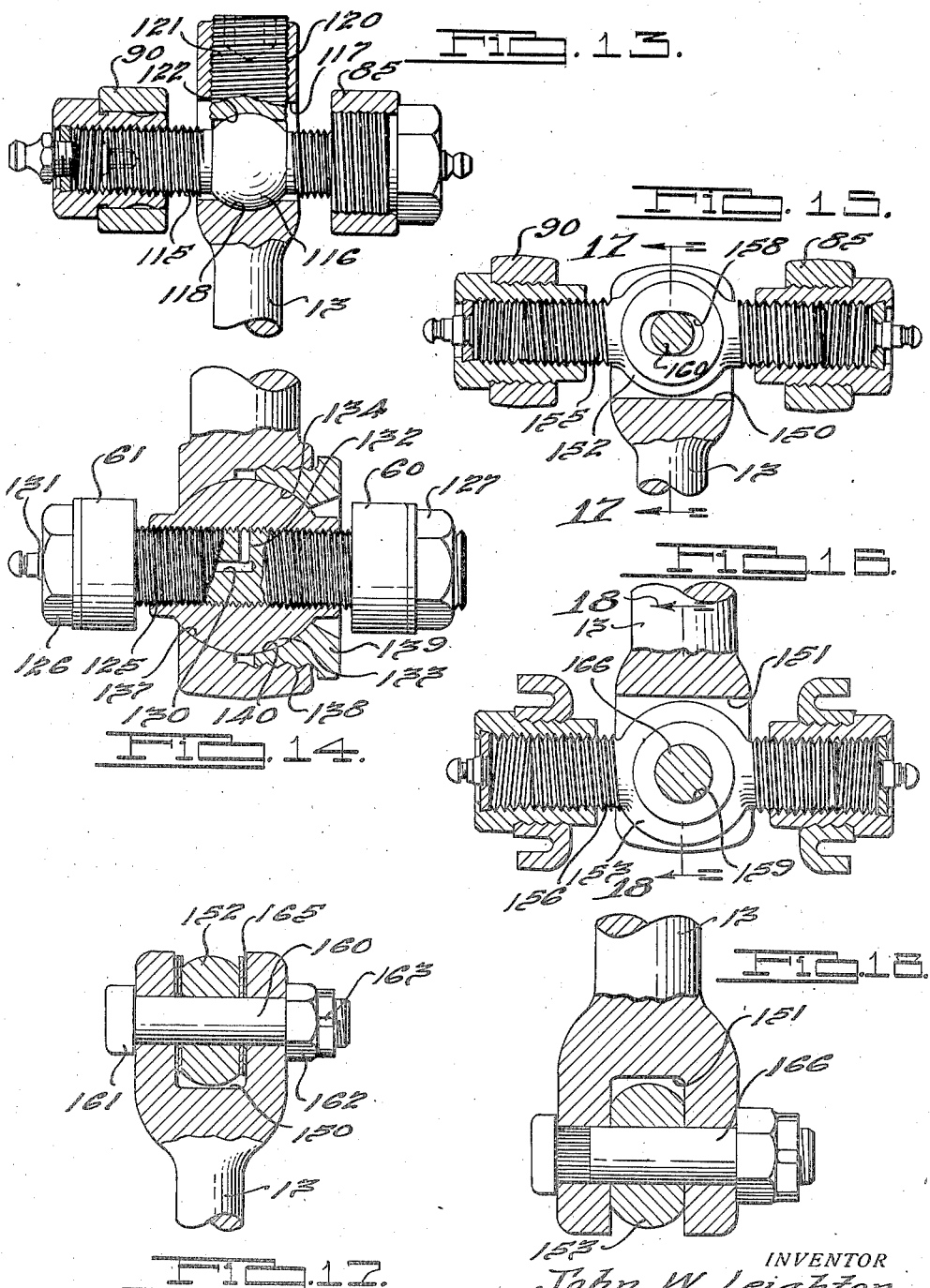
INVENTOR
John W. Leighton.
BY Harness, Dickey & Pierce.
ATTORNEYS.

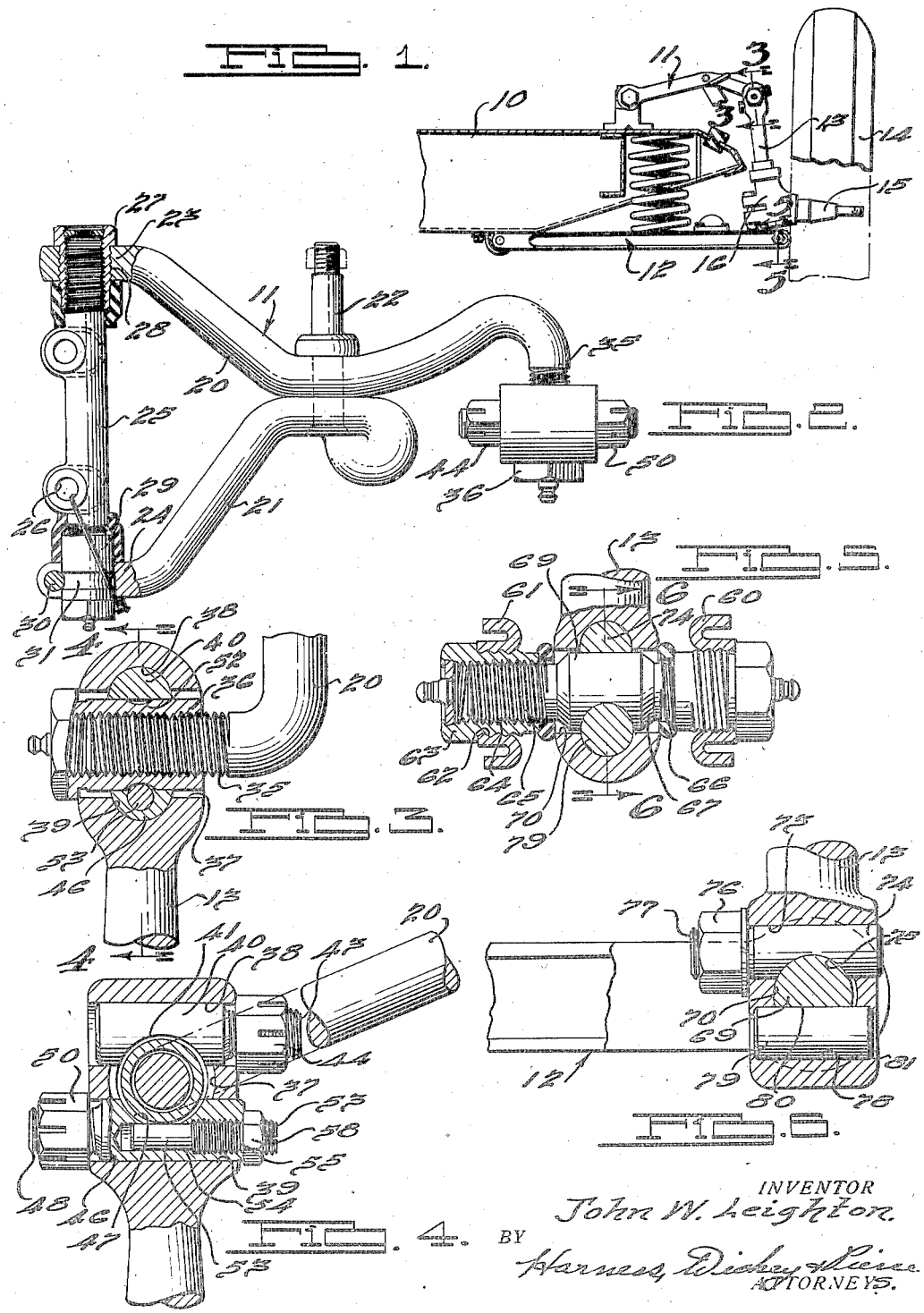

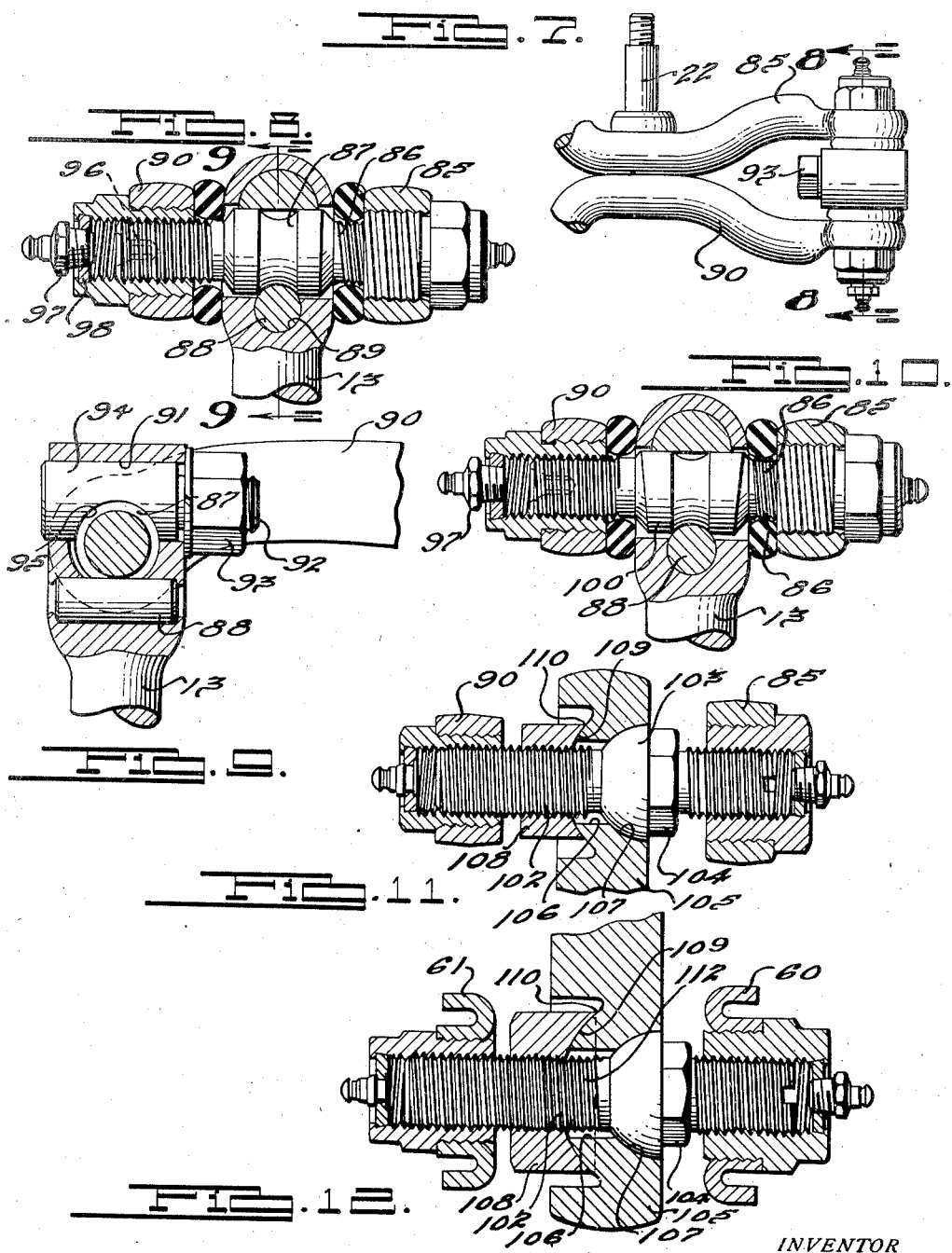

Patented Mar. 11, 1941

REISSUED
JUL 27 1943

2,234,803

UNITED STATES PATENT OFFICE 2,234,803

INDIVIDUAL SPRINGING CONNECTION

John W. Leighton, Port Huron, Mich.

Application November 2, 1938, Serial No. 238,457

16 Claims. (Cl. 280—96.2)

The invention relates generally to motor vehicles, and it has particular relation to the individual springing of wheels for such vehicles.

In general it may be mentioned that a conventional type of individual springing includes upper and lower links pivotally connected to the vehicle frame and which are pivotally connected at their outer ends to a vertically extending wheel mounting or supporting member. At least in certain installations it is desirable to provide means for varying the caster angle of the wheel or to provide a means for obtaining the correct caster angle initially when the installation is made, and this necessarily requires that the wheel mounting member be tilted in a direction longitudinally of the vehicle. Tilting of the wheel mounting member, in the event this member connects the outer ends of the links directly, requires that the connections between the member and the links be such as to permit the tilting movement. While it is not new generally speaking to tilt the wheel mounting member for this purpose, the present invention is concerned with improvements.

One object of the invention is to provide improved connections between the wheel mounting member and the link which will enable varying the caster angle or initially obtaining it in a simple and easy manner without interfering with alignment of the bearing forming the pivotal connection between the links and the member.

Another object of the invention is to provide improved connections between the wheel mounting member and the links, including threaded bearings, wherein means are provided for varying or obtaining the caster angle without interfering with the bearing between the threaded portions.

Another object of the invention is to provide improved connections for the purposes mentioned in the preceding objects, which are simple and inexpensive to manufacture, assemble, and to adjust.

Other objects of the invention will become apparent from the following specification, from the drawing pertaining thereto, and from the claims hereinafter set forth.

For a better understanding of the invention, reference may be had to the accompanying drawings, wherein:

Figure 1 is a fragmentary, elevational view, of individual springing embodying one form of the invention;

Fig. 2 is a plan view on a larger scale, partly in cross-section, of the upper link shown by Fig. 1;

Fig. 3 is a cross-sectional view on a larger scale taken substantially along the line 3—3 of Fig. 1;

Fig. 4 is a cross-sectional view taken substantially along the line 4—4 of Fig. 3;

Fig. 5 is a cross-sectional view taken substantially along the line 5—5 of Fig. 1;

Fig. 6 is a cross-sectional view taken substantially along the line 6—6 of Fig. 5;

Fig. 7 is a fragmentary, plan view of a different form of upper link, embodying another form of the invention;

Fig. 8 is a cross-sectional view on a larger scale taken substantially along the line 8—8 of Fig. 7;

Fig. 9 is a cross-sectional view taken substantially along the line 9—9 of Fig. 8;

Fig. 10 is a view on the order of Fig. 8, illustrating a form of the invention wherein camber adjustment is obtained along with caster adjustment;

Fig. 11 is a cross-sectional view indicating the connection at the outer end of an upper link, such as shown by Fig. 7, wherein still another form of the invention is embodied;

Fig. 12 is a view on the order of Fig. 5, illustrating a connection at the outer end of the lower link, wherein the connection is somewhat on the order of that shown by Fig. 11;

Fig. 13 illustrates a connection at the outer end of the upper link as constructed according to another form of the invention;

Fig. 14 illustrates another form of the invention employed at the outer end of the lower link;

Fig. 15 is a cross-sectional view illustrating still another form of the invention, which may be employed at the outer end of the upper link;

Fig. 16 is somewhat on the order of that shown by Fig. 15, illustrating a connection at the outer end of the lower link;

Fig. 17 is a cross-sectional view taken substantially along the line 17—17 of Fig. 15; and Fig. 18 is a cross-sectional view taken substantially along the line 18—18 of Fig. 16.

Referring to Fig. 1, the frame of a motor vehicle is indicated at 10, an upper link of the individual springing is indicated at 11, a lower link is indicated at 12, the wheel mounting member is indicated at 13, and a wheel on the latter is indicated at 14. It may be added that the wheel is mounted directly on an axle 15, which is integral with an apertured bearing portion 16 that is turnable on the wheel mounting member 13. Each of the links is pivotally connected to the frame, and the member 13 is pivotally connected to the outer ends of the links, so that the frame may move upwardly and downwardly with respect to the wheel.

The upper link 11 comprises arm portions 20 and 21 joined by a pin 22 which also serves as a shock absorber connection. Such arms, at their inner ends, have spaced apertured portions 23 and 24 receiving a control bar 25 having openings 26 adapting it to be bolted to the vehicle frame. Opposite ends of the bar 25 are threaded and the one end projecting through the aperture in portion 23 of arm 20 is threaded into a bushing 27, which in turn is threaded into the aperture and is rigidly locked therein by means of locking thread 28. The opposite end of the control bar is threaded into a bushing 29, which is clamped in the aperture of portion 24 by means of a bolt 30 which is partially received in a groove 31 in the bushing. It will be understood that the apertured portion 24 is bifurcated and that the bolt 30 draws the bifurcated portion in clamping relation around the bushing. At its outer end, arm 20 has a bent, threaded portion 35, which is parallel to the control bar 25.

Now referring to Figs. 3 and 4, the offset or bent portion 35 is threaded into a bushing 36, which is disposed in a substantially larger opening 37 in the wheel mounting member 13, that is, in the upper end of such member. As best shown by Fig. 4, the wheel mounting member above and below the center line of the opening 37, has transversely extending openings 38 and 39, which extend in a direction crosswise of the bushing 36. The opening 38 receives a pin 40, which has a substantially semi-cylindrical recess 41 in its lower side fitting the upper peripheral portion of the bushing. This pin terminates at one end in a threaded extension 43 which receives a nut 44 that contacts the outer surface of the wheel mounting member around the opening 38.

The opening 39 receives a similar pin 46 having a substantially semi-cylindrical recess 47, which fits the lower peripheral portion of the bushing. This pin terminates likewise in a threaded extension having a nut 50 thereon, which contacts that side of the wheel mounting member opposite the side contacted by the nut 44. It should now be appreciated that the pins 40 and 46 may be shifted and that by tightening the nuts 44 and 50, the bushing may be tightly clamped between the pins so as not only to locate the bushing but also to prevent its turning relative to the wheel mounting member. For positively preventing movement of the wheel mounting member longitudinally of the bushing, the latter is provided with an annular groove 52, which receives a pin 53 projecting into an opening 54 in the lower pin 46 and which partially projects through the recess 47 in the latter. The pin 53 has a threaded outer end 55 and the outer end of opening 54 is threaded for receiving this threaded portion of the pin and such pin 53 is locked in position by a nut 58 which may be jammed against the outer end of pin 46.

As shown by Fig. 5, the outer end of link 12 has two arm portions 60 and 61, each of which has a threaded opening 62 receiving a bushing 63. Threads in the opening and the threads in the bushing are of locking character so that when the bushing is threaded into place, it is locked in the opening. These bushings are internally threaded, as indicated at 64, and receive respectively, opposed threaded ends 65 and 66 of a pin 67. At its center, the pin 67 has an enlarged non-threaded portion 69, which passes through a substantially larger opening 70 formed in the lower end of the wheel mounting member 13.

As best shown by Fig. 6, the wheel mounting member 13 has a transversely extending opening 73 which receives a pin 74 that has a partially cylindrical recess 75 fitting the upper peripheral portion of the enlargement 69. One end of this pin is threaded, as indicated at 77, and receives a lock nut 76 which contacts the face of the wheel mounting member. Below the enlargement 69 of pin 67, the wheel mounting member has a second opening 78, which receives a pin 79 that in turn fits a groove or recess 80 formed transversely in the lower side of the enlargement 69. In this instance, the pin is locked in position by peening over the metal at both ends thereof, as indicated at 81. It will be apparent that by tightening the nut 76, the pin 67 and the enlarged portion 69 thereof in particular, may be positively locked to the wheel mounting member 13 both against turning and against longitudinal movement, although it will be appreciated that in tightening the nut 76, the enlarged portion 69 will be drawn against the side of the opening 70.

Considering Figs. 5 and 6, it will be realized that upon loosening the nut 76, the member 13 may be tilted longitudinally of the pin 67 within limits permitted by the size of the opening 70, and that during any tilting movement of this character, the pin 74 necessarily will turn slightly relative to the wheel mounting member. Now considering Figs. 3 and 4, it will be appreciated upon loosening the nuts 44 and 50, that the bushing 36 may be turned and the upper end of the wheel mounting member 13 thus shifted longitudinally in a tilting manner relative to the threaded portion 35 of the arm 20. During any tilting movement of this character, both the pin 40 and the pin 46 will turn slightly in the openings 38 and 39 provided respectively therefor. After tilting the wheel mounting member 13 to the desired extent to obtain the desired castering angle, the nuts 44 and 50 may be tightened at the upper end of the member so as to lock the bushing rigidly to the member and the nut 76 may be tightened at the lower end of the member so as to lock the latter to the pin 67.

It is to be observed that the threaded bearing, both at the upper end of the wheel mounting member and at the lower end thereof, is not disturbed by the aforedescribed manipulation. This leaves the threaded engagement in a normal, freely turning condition, and thus, regardless of the adjustment made, the threaded pivotal bearing will have a free, oscillatory action.

Figs. 7, 8 and 9 show another form of the invention which may be employed at the upper end of the wheel mounting member, although it might be observed also that the same connection might be used both at the lower and upper ends of the wheel mounting member. It also might be advanced at this time that either of the two forms of connections shown by Figs. 3 and 5 may be used at either or both of the ends of the wheel mounting member. Referring to Figs. 7 and 8, the upper arm in this instance has two outer end portions 85 and 90, which have pivotal threaded bearing engagement with a pin 86 in substantially the same manner as that characterizing the connection shown by Fig. 5. The pin 86, in this instance, has an annular groove 87, which substantially fits a pin 88 located in an opening 89 in the wheel mounting member 13. An upper pin 94 disposed in an opening 91 in the wheel mounting member 13, above the axis of the bearing, has a threaded extension 92 receiving a nut 93 that engages the side of the wheel mounting member. This pin has a recess 95 fitting the upper peripheral portion of the pin 86 and upon tightening the nut 93, the enlarged intermediate portion of the pin may be locked against the side of the opening in the wheel mounting member and against the lower pin 88. It will be noted at one end of the pin 86 that there is a socket 96 for receiving a wrench, so that the pin may be turned and access is had to this socket by providing an Alemite fitting 97, which is threaded through a Welch plug 98 in the outer end of the bushing receiving the threaded end of the pin. Upon loosening the nut 93, the pin may be turned and necessarily it will travel in a longitudinal direction and owing to its engagement with the lower pin 88, the upper end of the wheel mounting member will be carried along with the pin, so that the member will be tilted, it being understood that the upper pin 94 will turn slightly in its opening in accommodation of this movement. Thus, with the lower end of the wheel mounting member free to pivot or tilt, the upper end may be shifted by moving the pin and in this manner the caster angle may be varied. It should be understood that a connection such as shown by Fig. 5 may be employed at the lower end of the wheel mounting member and the lower end be allowed to pivot as previously described in connection with the latter figure. Upon obtaining the proper caster angle, the nut 93 may be tightened so as to lock the pin in place relative to the wheel mounting member and likewise the lower end of the wheel mounting member may be locked to the lower pin. Again, it may be stated that the adjustments at both ends of the wheel mounting member leave the threaded bearing in a freely, oscillatory condition.

The construction shown by Fig. 10 is like that shown by Fig. 8, excepting that the intermediate portion of the pin is eccentric, as indicated at 100. In this case, turning of the pin 86 in the manner already described for adjusting the caster angle, likewise will tilt the member 13 in a direction laterally of the vehicle, so as to adjust the camber angle. The connection at the lower end of the wheel mounting member, as for example the connection shown by Fig. 5, readily will permit tilting of the wheel mounting member both for obtaining such caster and camber adjustment.

Now referring to Fig. 11, the arms 85 and 90, comprising the upper arm as shown by Fig. 7, have pivotal bearing engagement with a threaded pin 102, which has an intermediate partially spherical enlargement 103 located adjacent a hexagonal head portion 104 integral with the pin. The wheel mounting member in this instance is of slightly different contour as compared to the member 13 and is indicated by the numeral 105, and such member has an enlarged opening 106 through which the pin 102 passes and a partially spherical seat 107 fitting the spherical enlargement 103 on the pin. A bushing 108 threaded on the pin has one end formed with a spherical seat 109, which fits a spherical surface 110 at that side of the member opposite the seat 107. It will be appreciated that by tightening the bushing 108 and the head 103 against opposite sides of the wheel mounting member, the member may be positively locked to the pin and that by loosening the bushing 108 and turning pin 102, the member may be tilted.

At its lower end, the wheel mounting member 105 is similarly connected to a lower pin 112, which has threaded bearing engagement with the lower arms 60 and 61. It should now be understood that by loosening the connection at the lower end of the wheel mounting member, and likewise loosening the connection at the upper end thereof, that the wheel mounting member may be tilted to vary the caster angle, and when the proper angle is obtained, that the parts again may be tightened in each connection so as to positively lock each end of the wheel mounting member to its respective pin. Due to the spherical engagement at each end of the member, this tilting member is accommodated without disturbing the matching of the threaded bearings and from this it follows that a free oscillatory bearing is obtained in each connection.

It might be stated that in all of the arrangements described, adjustment of the caster angle necessarily will draw the outer ends of the upper and lower links slightly together or farther apart, depending upon the character of the adjustment. In other words, tilting of the wheel mounting member necessarily changes its effective length and it becomes effectively shorter as the tilting is increased and effectively longer as the member approaches the vertical.

In the arrangement shown by Fig. 13, the outer ends 85 and 90 have threaded bearing engagement with a pin 115 in substantially the same manner as described in connection with Figs. 5 and 8. The pin in this instance has a central ball portion 116, which is disposed in an enlarged opening 117 in the upper end of the wheel mounting member. At the lower side of the opening 117, a partially spherical seat 118 receives the lower side of the ball, while at the upper side of the latter, the member 13 has a vertically extending, threaded opening 120, which receives a threaded plug 121 that has a partially spherical seat 122 at its lower end, engaging the upper side of the ball. By tightening this plug, the ball may be locked in the socket provided and thus the pin will be locked to the member for rotation therewith. Upon loosening the plug 121, the pin 115 may be turned so as to shift the upper end of the wheel mounting member longitudinally of the pin axis to adjust the caster angle, and then when the proper angle is obtained, the plug may be tightened so as to again lock the pin and member together.

As shown by Fig. 14, the lower end of the wheel mounting member in this case has an enlarged opening which receives a pin 125 that is threaded throughout its length. This pin may be locked against rotation in both of the arms 60 and 61 by tight threaded engagement therewith and has an integral head 126 on one end and a nut 127 on its other end. It will be noted also that the pin has a lubricant passage 130 extending longitudinally through the pin to an Alemite fitting 131 and that the passage 130 communicates with a radial passage 132, from which it follows that the intermediate threaded portion of the pin may be supplied with lubricant. Such intermediate portion of the pin has a bushing 133 threaded thereon and the outer surface of this bushing is of spherical character, as indicated at 134. The opening in the wheel mounting member at one side has a spherical seat 137 fitting one spherical end portion of the bushing while at its opposite end, the opening in the member is threaded as indicated at 138 and receives a threaded bushing 139 which may be locked in place by using obtuse angle threads or threads of locking character. This bushing has a partially spherical seat 140 receiving the opposite end of the bushing and thus jointly the seat 137 and the seat 140 fit the spherical surface 134 on the bushing 133. By tightening the bushing 139, the bushing 133 may be locked to the wheel mounting member for rotation therewith. It follows that by loosening the bushing, the lower end of the wheel mounting member may be turned on the spherical surface to permit the caster adjustment described in connection with Fig. 13 and then the bushing 139 may be tightened to again lock the bushing 133 to the member. As in the previously described connections, the threaded bearings are maintained in a freely oscillatory engagement.

In the structure shown by Figs. 15 and 16, the upper end of the wheel mounting member is bifurcated, as indicated at 150, and the lower end is bifurcated, as indicated at 151, and these bifurcated portions, respectively, receive flattened but enlarged portions 152 and 153 of upper and lower pins 155 and 156. These threaded bearing engagement with the outer ends of the upper and lower arms in substantially the same manner as previously described in connection with Fig. 5. It will be noted that the enlarged, flattened portion 152 on the upper pin 155 has an elongated opening 158, while the flattened portion 153 on the lower pin is substantially circular, as indicated at 159. As shown best by Fig. 17, a bolt 160 passes through the opening 158 in the upper pin 155 and through openings in the legs of the bifurcated portion 150, and is provided with a head 161 on one end and a nut 162 having a cotter key lock on its opposite end. Spacing washers 165 may be provided on opposite sides of the enlarged portion 152 to substantially take up clearances. A similar bolt 166 connects the enlarged flattened portion 153 on the lower pin 156 to the lower bifurcated portion 151 of the wheel mounting member. By loosening the bolt 166 at the lower end of the member slightly, and loosening the nut 162 at the upper end of the member, the latter may be tilted to adjust the caster angle, and it will be appreciated that the elongated opening 158 will allow this to be accomplished. Then, by tightening the locking nuts again, the wheel mounting member may again be rigidly connected to the two bearing pins. If desired, the upper end of the mounting member may be entirely disconnected from the pin 155, and then the pin may be turned to move the intermediate portion 152 in one direction or another longitudinally of the pin, and then such portion may be disposed again in the bifurcated portion of the pin and locked to the member. If adjustment should be made in this last manner, the elongated opening 158 could be changed to a circular opening.

Although more than one form of the invention has been described and illustrated in detail, it will be apparent to those skilled in the art that various modifications may be made without departing from the scope of the appended claims.

What is claimed is:

1. In an individual wheel springing, a link, an upright wheel supporting member a threaded element rigidly fixed to the outer end of the link and having its axis extending longitudinally of the vehicle, a second threaded element having threaded pivotal bearing engagement with the first element, said wheel supporting member having an enlarged longitudinally extending opening receiving the second element, and means in said opening for adjustably clamping the wheel supporting member to the second element but being adjustable to allow adjustable tilting of the wheel supporting member in a direction longitudinally of the vehicle.

2. In an individual wheel springing, a link, an upright wheel supporting member, a threaded element rigidly fixed to the outer end of the link and having its axis extending longitudinally of the vehicle, a second threaded element having threaded pivotal bearing engagement with the first element, said wheel supporting member having an enlarged longitudinally extending opening receiving the second element, and means in said opening for adjustably clamping the wheel supporting member to the second element but being adjustable to allow adjustable tilting of the wheel supporting member in a direction longitudinally of the vehicle, said clamping means including a bolt extending transversely to the threaded elements and having a recess substantially fitting a portion of the second threaded element.

3. In an individual wheel springing, a link, an upright wheel supporting member, an externally threaded element on the outer end of the link and extending longitudinally of the vehicle, an internally threaded bushing threaded on said element, said wheel supporting member having an enlarged opening receiving said bushing, and adjustable means for clamping said bushing to the wheel supporting member and being adjustable to allow the adjustable tilting of the latter in a direction longitudinally of the vehicle and relative to the bushing and threaded bearing while still allowing the bushing to be clamped to the supporting member.

4. In an individual wheel springing, a link, an upright wheel supporting member, an externally threaded element on the outer end of the link and extending longitudinally of the vehicle, an internally threaded bushing threaded on said element, said wheel supporting member having an enlarged opening receiving said bushing, and adjustable means for clamping said bushing to the wheel supporting member and being adjustable to allow the adjustable tilting of the latter in a direction longitudinally of the vehicle and relative to the bushing and threaded bearing, while still allowing the bushing to be clamped to the supporting member, said adjustable means including a threaded part on the wheel supporting member and extending into the enlarged opening therein and having a recess receiving a peripheral portion of the bushing.

5. In an individual springing, a link, a wheel supporting member having an opening, an externally threaded element on the link extending through the opening, an internally threaded bushing in said opening and having pivotal threaded bearing engagement with the element, said opening being larger than the bushing so as to permit tilting of the member relative to the bushing, and a bolt extending transversely through the member and opening therein and having a recess receiving a peripheral portion of the bushing within said opening.

6. In an individual springing, a link, a wheel supporting member having an opening, an externally threaded element on the link extending through the opening, an internally threaded bushing in said opening and having pivotal threaded bearing engagement with the element, said opening being larger than the bushing so as to permit tilting of the member relative to the bushing, a bolt extending transversely through the member and having a recess receiving a peripheral portion of the bushing at one side of the opening, and a second bolt extending through the member and having peripherally fitting engagement with an oppositely located peripheral portion of the bushing, said bolts when turned permitting tilting of the member relative to the bushing in a direction longitudinally of the bushing.

7. In an individual springing, a link, a wheel supporting member having an opening, an externally threaded element on the link extending through the opening, an internally threaded bushing in said opening and having pivotal threaded bearing engagement with the element, said opening being larger than the bushing so as to permit tilting of the member relative to the bushing, a bolt extending transversely through the member and opening therein and having a recess receiving a peripheral portion of the bushing within said opening, and a pin extending transversely of the bushing and seated in a groove therein for preventing movement of the member longitudinally of the bushing.

8. In an individual springing, a member having an opening, a bearing element extending through said opening, the opening being substantially larger than the element, and mans for adjustably locating the element in the opening so as adjustably to permit tilting of the member relative to the element in a direction longitudinally of the latter, said means comprising a pin member extending transversely through the member and into the opening therein and having a recess receiving a peripheral portion of the element.

9. In an individual springing, a member having an opening, a bearing element extending through said opening, the opening being substantially larger than the element, and means for adjustably locating the element in the opening so as adjustably to permit tilting of the member relative to the element in a direction longitudinally of the latter, said means comprising pin elements extending transversely through the member at opposite sides of the bearing element and having locating engagement with opposite sides of the element.

10. In an individual springing, a member having an opening, a bearing element extending into said opening and being substantially smaller than the opening, a pair of pins slideable respectively in openings extending transversely through the member at opposite sides of the element and each having a recess receiving a peripheral portion of the element, and means for adjustably locating the pins so as to enable adjustably locating the bearing element relative to the member.

11. In an individual springing, a member having an opening, a bearing element extending into said opening and being substantially smaller than the opening, a pair of pins slidable respectively in openings extending transversely through the member at opposite sides of the element and each having a recess receiving a peripheral portion of the element, and means for moving the pins in opposite directions so as to clamp the bearing element between them.

12. In an individual springing, a member having an opening, a bearing element extending into said opening and being substantially smaller than the opening, a pair of pins slideable respectively in openings extending transversely through the member at opposite sides of the element and each having a recess receiving a peripheral portion of the element, said pins being turnable about their own axes so as to allow tilting of the bearing element relative to the member, and means for moving the pins in opposite directions so as to clamp the bearing element between them.

13. In an individual wheel springing, an externally threaded member, an internally threaded bushing threaded on and having pivotal threaded bearing engagement with the threaded member, a second member having an opening substantially larger than and receiving the bushing, and adjustable means clamping the second member on the bushing but being adjustable to allow tilting of the bushing relative to the member in a direction longitudinally of the bushing, the arrangement being such that the members can turn relatively on a threaded bearing while being capable of being tilted relatively and clamped in relatively different positions.

14. In an individual springing, a threaded member, an internally threaded bushing on the member, a second member having an opening receiving the bushing, and adjustable means clamping the second member on the bushing but being adjustable to allow tilting of the bushing relative to the member in a direction longitudinally of the bushing, said bushing having its outer surface of spherical contour and the opening in the second member being complementary thereto.

15. In an individual springing, a threaded member, an internally threaded bushing on the member and having its outer surface of spherical contour, a second member having a spherical socket receiving one end of the bushing and having a larger threaded opening around the other end of the bushing, and a socket and clamping member threaded into such larger opening and fitting the other end of the bushing.

16. In an individual springing, a threaded member, an internally threaded bushing on the member and having a spherical surface, a second member having a spherical surface fitting the surface on the bushing and means adjustably clamping the spherical surfaces together but allowing relative tilting of the second member and bushing in a direction lengthwise of the threaded member.

JOHN W. LEIGHTON.